United States Patent
Mathur et al.

(10) Patent No.: US 9,088,647 B2
(45) Date of Patent: Jul. 21, 2015

(54) METHOD AND SYSTEM FOR VOICE-BASED CONTACT UPDATION

(71) Applicant: Samsung Electronics Co., Ltd., Suwon-si, Gyeonggi-do (KR)

(72) Inventors: Harshit Mathur, Noida (IN); Mayank Kumar Gururani, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/508,287

(22) Filed: Oct. 7, 2014

(65) Prior Publication Data

US 2015/0098556 A1    Apr. 9, 2015

(30) Foreign Application Priority Data

Oct. 8, 2013   (IN) ............... 4558/CHE/2013

(51) Int. Cl.
*H04M 1/64*      (2006.01)
*H04M 3/42*      (2006.01)
*H04M 3/493*     (2006.01)

(52) U.S. Cl.
CPC ........ *H04M 3/42042* (2013.01); *H04M 3/4936* (2013.01)

(58) Field of Classification Search
CPC .......... H04M 2201/40–2201/41; H04M 3/385
USPC ................ 379/88.02, 88.04; 381/56; 704/500
See application file for complete search history.

(56) References Cited

U.S. PATENT DOCUMENTS

| | | | |
|---|---|---|---|
| 6,249,765 B1 * | 6/2001 | Adler et al. .................... | 704/500 |
| 6,687,362 B1 | 2/2004 | Lindquist et al. | |
| 7,189,132 B2 | 3/2007 | Nacik et al. | |
| 8,588,377 B2 * | 11/2013 | Shaffer et al. .............. | 379/88.04 |
| 2005/0069095 A1 * | 3/2005 | Fellenstein et al. ........ | 379/88.02 |
| 2007/0078572 A1 | 4/2007 | Deker et al. | |
| 2015/0030163 A1 * | 1/2015 | Sokolov .......................... | 381/56 |

* cited by examiner

*Primary Examiner* — Fan Tsang
*Assistant Examiner* — Van D Huynh
(74) *Attorney, Agent, or Firm* — Jefferson IP Law, LLP (57) ABSTRACT

A method and a system for updating contact information in an electronic device include capturing a voice of a caller to generate a voice signature. The method includes determining presence of the voice signature in the electronic device. The method includes updating contact information of the caller based on the voice signature.

13 Claims, 7 Drawing Sheets

METHOD AND SYSTEM FOR VOICE-BASED CONTACT UPDATION

RELATED APPLICATIONS

This application claims priority from Indian Patent Application No. 4558/CHE/2013, filed on Oct. 8, 2013, in the Indian Patent Office, the disclosures of which are incorporated herein by reference in their entireties.

BACKGROUND

1. Field

The present invention relates to the field of updating contact information in an electronic device and more specifically to the field of updating contact information of a caller by means of voice analysis.

2. Description of the Related Art

Phone book provides a means for storing and retrieving contact information of users. Various methods exist to add a contact in a phone book. Existing methods to add contacts include but are not limited to, manually entering contact information using a keypad, importing contact information from a storage device, importing contact information using a business card scanner, and transferring contact information using Bluetooth to automatically synchronize the phone book with new contacts. Typically, adding or updating contact information is performed manually.

In an existing prior art, the contact information of the users is stored in a telephone exchange. A database at the exchange is used to identify a user. Upon initiation of a call by the user to a first time caller, the phone book of the first time caller is updated with the contact information of the user from the database at the exchange. For example, a user A initiates a call with a user B. The contact information for the user A is displayed on the mobile phone of the user B. The contact information is picked up from the database, wherein in addition to the user's name and contact number, contact information such as but not limited to email, address, and organization are present. The first time caller's phone book is updated with the contact information obtained from the database located at the exchange. The method eliminates the need for manual entry of user's contact information in the phone book. However, it falls short of providing the user's contact information if not present in the database. Further, the user is required to subscribe to a service for obtaining contact information from the database.

In another prior art, the contact information is managed and updated by a system. Users are linked by a network-based contact information management system. The system provides contact information to each called party based on levels of permission granted by other users. The accessibility of the caller's contact information to other users can be managed, wherein each user is permitted various levels of accessibility. For example, a user A initiates a call with a user B. The contact information of the user A is available with the user B, if the user A has provided full access to the contact information through the network-based contact management system. The system eliminates the need for manual entry of contact information in the phone book. However, the prior art fails to provide the contact information of the caller not present in the system. Further, a user won't receive the contact information of a first time caller.

Moreover, storing the contact information in the database can jeopardize the user's privacy. Further, the database located at one of the exchange and the network can be vulnerable because apart from the user's name and contact number, personal details such as but not limited to, email, address and organization are present.

In light of the foregoing discussion, there is a need for an efficient method to update contact information of the user by identifying the caller. The present invention identifies the caller by voice analysis and automatically updates contact information of the caller.

SUMMARY

An example of a method of updating contact information in an electronic device includes capturing a voice of a caller to generate a voice signature. Further, the method includes determining presence of the voice signature in the electronic device. The method includes updating contact information of the caller based on the voice signature.

An example of a method of updating contact information in an electronic device includes capturing a voice of a caller. The method further includes sampling the voice of the caller to generate voice samples and generating a voice signature of the caller. Further, the method includes comparing the voice signature with a plurality of voice signatures. Furthermore the method includes recommending relevant keywords to the called party if the caller is identified as an unknown contact and updating the contact information of the caller upon selection of the relevant keywords by the called party.

An example of a system for updating contact information in an electronic device includes a mobile client to periodically generate voice samples of a caller. Further, the system includes a user interface to receive the voice samples of the caller. Further, the system includes a voice sample analyser to minimize noise from the voice samples. Furthermore, the system includes a voice signature generator to generate a voice signature. Further, the system includes a voice signature comparator to compare the voice signature with a plurality of voice signatures present in the electronic device of a called party. Furthermore, the system includes a keyword extractor to extract relevant keywords from the voice samples. Further, the system includes a recommendation module to recommend relevant keywords to the called party and a synchronized phone book to update the contact information of the caller.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Embodiments of the present disclosure described herein provide a method and a system for automatically updating contact information of the caller based on voice analysis. For example, an unknown caller initiates a call with a called party. The method and the system described herein capture the conversation between the caller and the called party to generate relevant keywords and voice signature. The relevant keywords can be used to store the contact information of the unknown caller.

Figure 1:
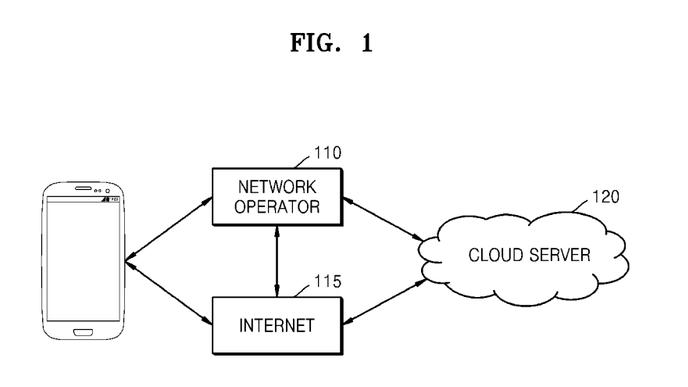
FIG. 1 is a block diagram of an environment, in accordance with which various embodiments of the present invention can be implemented.

FIG. 1 is a block diagram of an environment, in accordance with which various embodiments of the present invention can be implemented. The environment includes an electronic device 105, a network operator 110, internet 115 and a cloud server 120. The electronic device 105 includes but not limited to a mobile phone, a smartphone, a tablet, and a smart watch. In one embodiment, the electronic device 105 is a mobile phone. The mobile phone is connected to the cloud server 120 over the internet 115 via the network operator 110 or any other Internet source.

Figure 2:
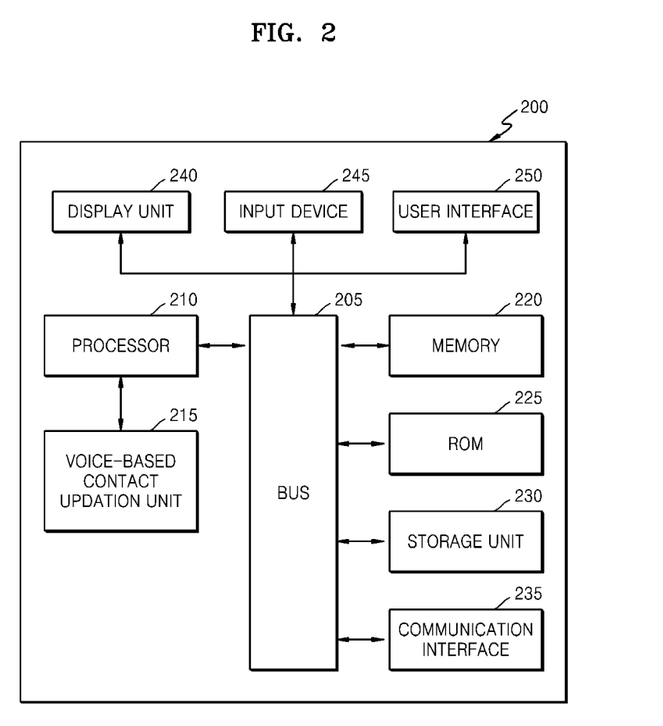
FIG. 2 is a block diagram of a system in accordance with one embodiment of the present invention.

FIG. 2 is a block diagram of a system 200, in accordance with one embodiment of the present invention. The system 200 is an electronic device which includes but not limited to a mobile phone, a smartphone, a tablet, and a smart watch. The system 200 includes a bus 205, a processor 210, a voice-based contact updating unit 215, a memory 220, a Read Only Memory (ROM) 225, a storage unit 230, a communication interface 235, a display unit 240, an input device 245 and a user interface 250. The bus 205 is used as a means for transferring information to and from the processor 210 to at least one of the memory 220, the ROM 225, the storage unit 230, the communication interface 235, the display unit 240, the input device 245 and the user interface 250. The processor 210 consists of an integrated electronic circuit for processing and controlling functionalities of the system 200. The voice-based contact updating unit 215 is used for performing voice analysis. In FIG. 2, the voice-based contact updating unit 215 is shown as part of the electronic device.

The memory 220, such as a random access memory (RAM) or other dynamic storage device is coupled to the bus 205 for storing information which can be used by the processor 210. The memory 220 can be used for storing any temporary information required by the processor 210. The system 200 further includes the ROM 225 or other static storage device coupled to the bus 205 for storing static information. The storage unit 230 includes one of a magnetic disk and a flash storage coupled to the bus 205 for storing information.

Various embodiments are related to the use of the system 200 for implementing the present invention is described herein. In one embodiment, the processor 210 enables voice analysis using the information included in the memory 220. The instructions for performing voice analysis are stored in the memory 220. The instructions can be read into the memory 220 from another machine-readable medium, such as the storage unit 230. Common forms of machine-readable medium include, for example, a hard disk, a CD, a DVD, the RAM, a PROM, an EPROM, an EEPROM or any other form of machine-readable medium. The system 200 also includes a communication interface 235 coupled to the bus 205. The communication interface 235 provides a two-way data communication coupling to the network operator 110.

The system 200 can be coupled via the bus 205 to the display unit 240, such as but not limited to a liquid crystal display (LCD) or a light emitting diode (LED) display, for displaying information. The input device 245, including alphanumeric and other keys, is coupled to the bus 205 for communicating an input to the processor 210. The user interface 250 can support swipe, pattern, and voice recognition or cursor direction keys for communicating the input to the processor 210 and for controlling cursor movement on the display unit 240. In one embodiment the display unit 240, the input device 245 and the user interface 250 can be a single unit, for example a touch screen. Further, the user interface 250 displays contact information of the caller.

Figure 3:
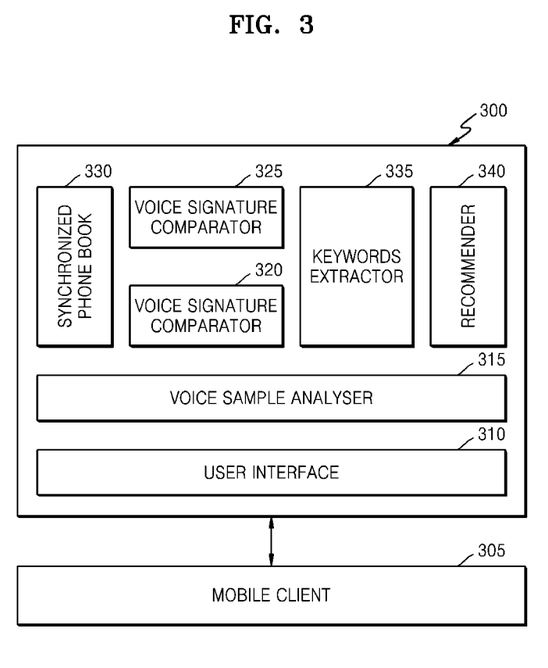
FIG. 3 illustrates a block diagram of a system for updating contact information automatically based on voice analysis, in accordance with another embodiment of the present invention.

FIG. 3 illustrates a block diagram of a system for updating contact information automatically based on voice analysis. The system 300 is a voice-based contact updating unit. The system 300 consists of a mobile client 305, a user interface 310, a voice sample analyser 315, a voice signature generator 320, a voice signature comparator 325, a synchronized phone book 330, a keywords extractor 335 and a recommender 340. The system 300 can be present at one of an electronic device and a cloud server.

In one embodiment, the electronic device is a mobile phone for performing voice analysis, wherein the mobile phone includes the system 300. The mobile client 305 can reside in the mobile phone and is deployed on a specific port on the mobile phone. The mobile client continuously captures the voice of a caller and periodically generates voice samples. The system 300 further processes the voice samples.

The user interface 310 acts as an interface between the mobile client 305 and the voice sample analyser 315. The tasks performed by the user interface 310 include receiving the voice samples as an input from the mobile client 305 and sending the voice samples to the voice sample analyser 315. The voice sample analyser 315 removes noise and distortion from the voice samples in order to improve efficiency of voice analysis. Further, the mobile phone accesses the synchronized phone book 330 through the user interface 310.

The voice signature generator 320 analyses the voice samples to generate a voice signature with a high degree of accuracy. The voice signature generator 320 analyses the voice samples and detects voice characteristics that are significant for identification of the caller. The output of the voice signature generator 320 is sent to the voice signature comparator 325 for further processing.

The voice characteristics of a person in a speech segment are scattered across time spectrum and frequency spectrum. In the time spectrum, the voice characteristics are affected by pitch, energy, stress and context of each speech segment. In the frequency spectrum, voice characteristics are conveyed by different degrees across diverse sub-bands. Physiological characteristics of the person's voice are affected by gender, age, vocal tract shape and size. Accent variation is another major characteristic of the person's voice.

The voice signature comparator 325 receives the voice signature from the voice signature generator 320. The voice signature comparator 325 finds the closest possible match for a newly generated voice signature in a phone book. The contact information in the phone book consists of previously mapped voice signatures with respective names and numbers of callers. The voice signature comparator 325 compares the newly generated voice signature with a plurality of voice signatures existing in the electronic device. For a matched voice signature, the system 300 obtains matched contact information from the phone book. For an unmatched signature, the system 300 requests the keyword extractor 335 to generate relevant keywords.

The synchronized phone book 330 retains a copy of the contact information present in the mobile phone of a called party. The synchronized phone book 330 is synchronized by making periodic calls for synchronizing with the contact information in a phone book present in the mobile phone.

The keywords extractor 335 extracts the relevant keywords and content information from the voice samples received from the voice sample analyser 315. The relevant keywords are given to the recommender 340 and sent to the called party as information to be saved in the phone book. The keywords extractor 335 extracts the relevant keywords only if, the comparison of voice signatures in the voice signature comparator 325 results in an unmatched voice signature. For a matched voice signature, the phone book is automatically updated.

The steps involved in the keyword extractor 335 include but not limited to text conversion, tokenization, stop word removal, stemming. In order to process the voice samples from the voice sample analyser 315, the voice samples are converted to a textual format. The next step is tokenizing, wherein the text is split into a string of characters and further into a set of tokens. The text is split into categories such as alphabets, white spaces and punctuations. Further, the tokens are identified as but not limited to preposition, noun, verb, and adjective. Further, the keyword extractor 335 performs stop word removal; wherein irrelevant words are removed from the tokens. A conversation contains a plurality of words called stop words, which are irrelevant as the contact information. The stop words include but are not limited to 'a', 'an', 'the', 'at', 'of'. The stop words are removed from the text. In general, stop words such as pronouns, prepositions, conjunctions are removed from the text. Further, the keyword extractor 335 performs stemming, wherein all the words in the text are reduced to base words. For example, the word 'consideration' is stemmed to 'consider'. Stemming aids in removal of words with duplicate stem or word root that mostly describe equivalent or comparatively close concepts in the text.

The recommender 340 receives results from the keyword extractor 335 and sends it to the user interface 310. The relevant keywords are displayed on a display device of the electronic device. The called party selects the most relevant keyword from the recommendations. Further, the called party stores the keyword as the contact information in the phone book. The contact information includes but not limited to a name associated with a caller's telephone number, caller's email, caller's address.

Figure 4A:
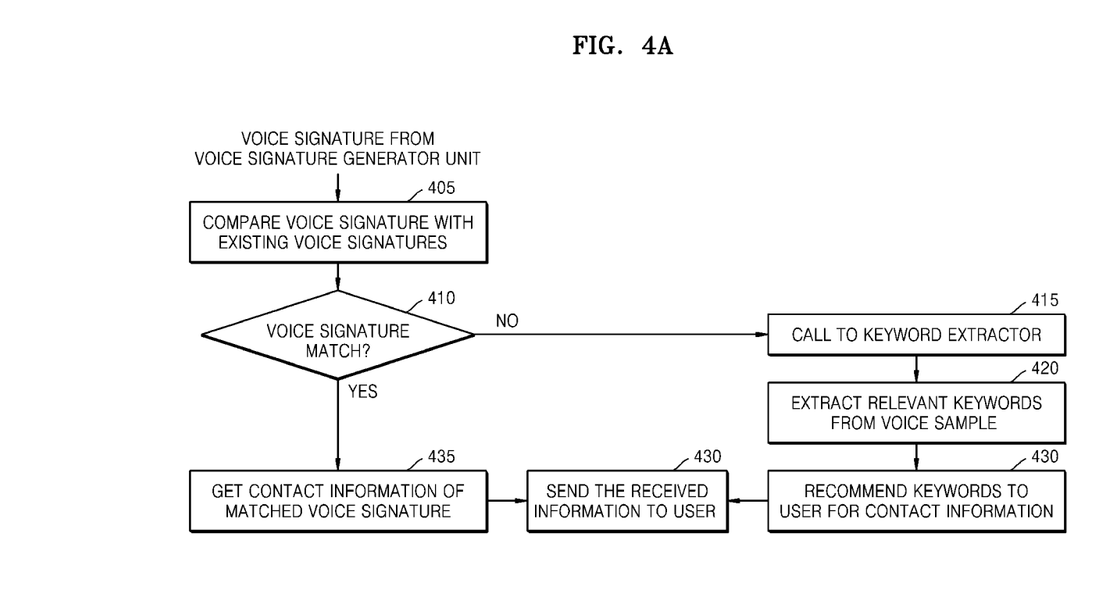
FIG. 4A illustrates a flowchart for comparing voice signatures and recommending relevant keywords to a called party.

FIG. 4A illustrates a flowchart for comparing voice signatures and recommending relevant keywords to a called party.

At step 405, the voice signature of a caller generated from a voice signature generator and existing voice signatures present in a phone book of an electronic device are compared. The voice signature is generated from voice samples obtained by a voice sample analyser.

At step 410, if there is a match for voice signature then step 435 is performed, else step 415 is performed. The voice signature comparison is performed by a voice signature comparator. The voice signature comparator compares the newly generated voice signature with a plurality of voice signatures existing in the phone book. The voice signature is matched based on voice characteristics of the calling party such as but not limited to pitch, energy and stress.

At step 435, if there is a voice signature match then contact information of the matched voice signature is retrieved from the phone book. In one scenario, the contact information is updated from the phone book present in a cloud server.

At step 415, if there is no match for the voice signature then a keyword extractor is used to extract the relevant keywords. Keywords are extracted by plurality of steps such as but not limited to, tokenizing, stop word removal and stemming At step 420, the relevant keywords are extracted from the voice sample. The relevant keywords include such as but not limited to, a name, an organization name, other content that can be stored as part of contact information.

At step 425, the recommendations for saving contact information is extracted from the voice samples. The recommendations are sent from the recommender to the mobile client present in the electronic device. Further, the recommendations are displayed on the electronic device.

At step 430, the relevant keywords are sent to the called party. The called party selects the most relevant keyword and stores it in the phone book. The voice signature is stored with the name (relevant keyword) and number of the caller. A synchronous phone book present on the cloud server is updated simultaneously for any changes in the phone book of the electronic device.

Figure 4B:
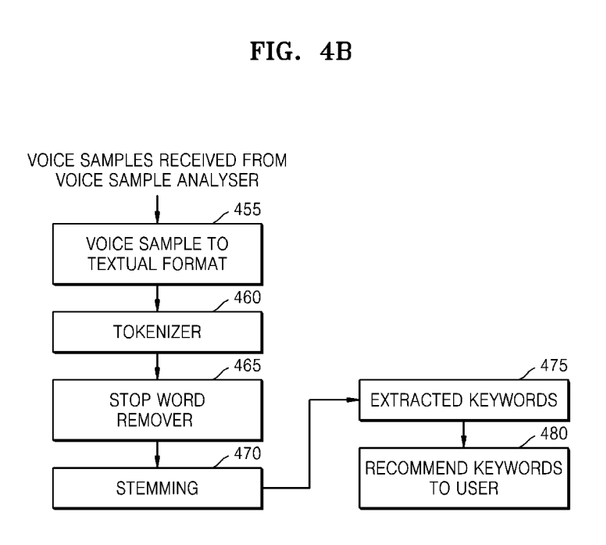
FIG. 4B illustrates a flowchart for extracting relevant keywords from voice samples and sending it to a called party.

FIG. 4B illustrates a flowchart for extracting relevant keywords from voice samples and sending it to a called party.

At step 455, voice samples are received from the voice sample analyser. The voice samples are converted to textual format for ease of processing. The textual format of the voice samples represents a conversation between the called party and the caller.

At step 460, the voice samples in textual format are tokenized. Tokenizing ensures that alphabets, white spaces and punctuations are separated.

At step 465, a stop word remover is used to remove words that do not provide any meaningful understanding of the conversation between the called party and the caller. Stop words such as 'a', 'an', 'the', 'what', 'when', etc. are removed from the textual data. The stop word remover is defined such that the keyword extractor is capable of extracting the relevant keyword from a plurality of text.

At step 470, stemming algorithms are implemented on the text. The remaining words in the text after performing stop word removal are brought down to the word root or stem.

At step 475, keywords are generated. The keywords are text obtained after tokenizing, stop word removal and stemming. The extracted keywords are used to store contact information in the phone book.

At step 480, the extracted keywords are sent as recommendations to the called party. The called party saves the most relevant keyword as the contact information of the caller.

Figure 5:
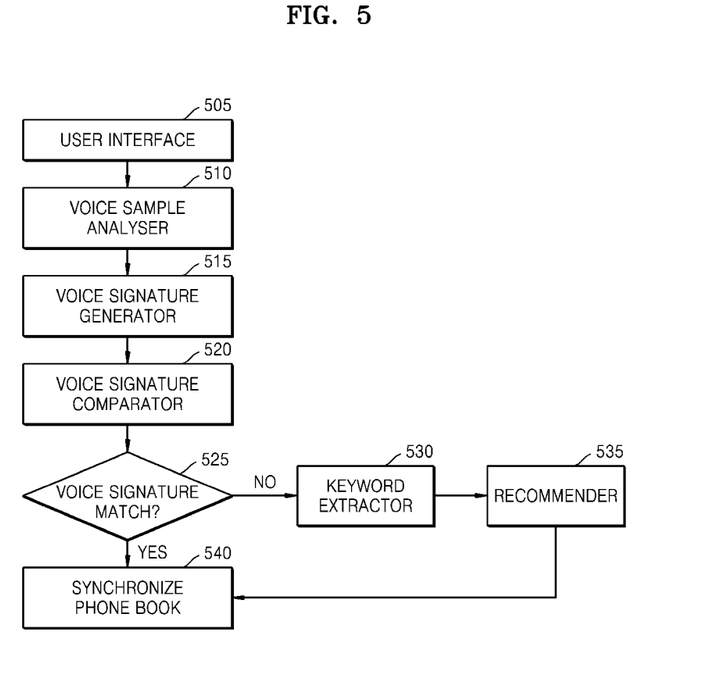
FIG. 5 illustrates a flowchart for updating contact information automatically based on voice analysis.

FIG. 5 illustrates a flow chart for updating contact information automatically based on voice analysis.

At step 505, a user interface receives voice samples at periodic intervals of time from a mobile client. The user interface forwards the voice samples to a voice sample analyser.

At step 510, the voice samples are given as an input to the voice samples analyser. The voice sample analyser suppresses noise, equalizes and removes any distortion present in the voice samples. The voice sample analyser forwards the distortion less and noise free voice samples to a voice signature generator.

At step 515, the voice samples are given as input to the voice signature generator. The voice signature generator generates a unique voice signature for a called party. The voice signature of a caller is forwarded to a voice signature comparator.

At step 520, the voice signature comparator compares the voice signature obtained from the voice signature generator and voice signatures present in a phone book.

At step 525, if a voice signature results in a no match then step 530 is performed else step 540 is performed.

At step 530, a keyword extractor is used to extract relevant keywords from the voice sample obtained voice sample analyser. The keyword extractor performs tokenization, stemming, stop word removal.

At step 535 a recommender outputs the relevant keywords to the called party via the user interface. The called party can select the appropriate keyword from the recommended list of keywords.

At step 540 a synchronized phone book is updated if there is a change in contact information in the phone book in an electronic device.

Figure 6:
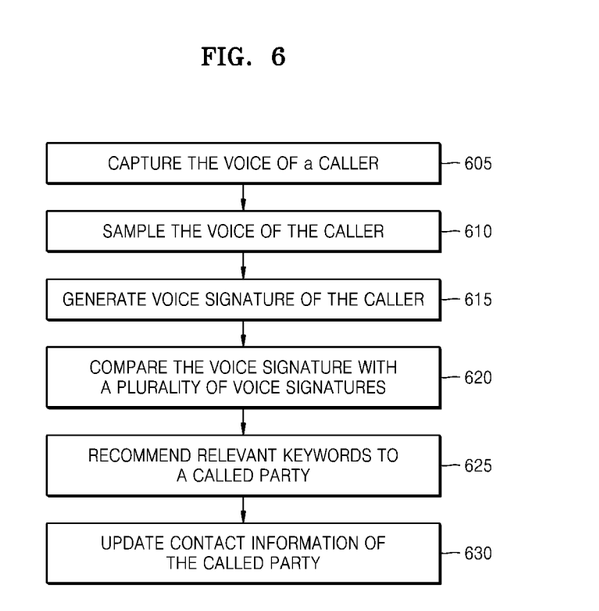
FIG. 6 illustrates a method of updating contact information in an electronic device based on voice analysis.

FIG. 6 illustrates a method of updating contact information in an electronic device based on voice analysis.

At step 605, the voice of a caller is captured during a conversation between a called party and the caller. The caller can be one of a first contact and a second contact. The first contact is a first time caller whose contact information is not stored in the electronic device. The second contact is a person calling from an unknown number whose name and voice signature are present in the electronic device.

At step 610, the caller's voice is analysed and sampled. In the voice samples, noise is suppressed, equalized and distortions are removed for ease of using the voice samples for later stages.

At stage 615, a unique voice signature of the caller is generated from the voice samples. The voice signature is generated based on the voice characteristics of the caller.

At stage 620, the voice signatures are compared to verify the caller. The caller identity is established by means of mapping the existing voice signatures in the phone book of the called party with the voice signature generated using the voice samples of the caller. The caller is identified as the first contact if the voice signature does not match with the existing voice signatures. The caller is identified as the second contact if the voice signature matches with the existing voice signatures.

At step 625, if there is no match in the voice signatures of the caller with voice signatures present in the phone book of the called party, then relevant keywords are sent to the called party based on conversation between the called party and the caller. In the present scenario, the first contact is unknown to the called party.

At step 630, contact information of the first contact is added in the phone book of the called party. If the caller is the second contact, then the voice signature of the caller is mapped to an existing contact, and the contact information is updated accordingly. In the current scenario, the second contact is a known person calling from an unknown number.

In one embodiment of the present invention, the voice signatures can exist as part of the contact information in the phone book. The contact information in an electronic device include such as but not limited to, first name, last name, mobile number, email, address, notes. In addition to the existing fields in the phone book, a voice signature field is included to store the voice signature of the caller.

In another embodiment of the present invention, a known caller initiates a call to a user from a known number. The voice signature results in a match due to an existing voice signature in a phone book. In present scenario, no contact information is updated in the phone book.

In another embodiment of the present invention, a first caller initiates a call to the user from an unknown number. The voice signatures of the first caller do not match with the voice signatures present in the phone book. Therefore, contact information of the first caller is stored as a first contact. The contact information include voice signature for the first caller along with the keyword selected by the user.

In another embodiment of the present invention, a second caller already known to the user initiates a call from an unknown number. The voice signature results in a match due to an existing voice signature in the phone book. In such a situation, contact information is updated in the phone book along with the new number of the second caller.

In another embodiment of the present invention, it would be advantageous for electronic devices that do not have enough processing power, to have the system in the cloud server for processing voice. For example, mobile phones are broadly classified as feature phones and smartphones. The processing power in the feature phone is less compared to the processing power in the smartphone. Therefore, it would be advantageous to have the system at the cloud server for feature phones. Further, it would be advantageous to have the system implemented on the smartphone itself In another embodiment of the present invention, it would be relevant to one skilled in the art to have the system on the cloud for any other phones other than the aforementioned feature phones and smartphones. Any electronic device used for communication with low processing power can make use of the present invention by having the system on the cloud.

In another embodiment of the present invention, for electronic devices with the system on the cloud, a user A can grant permission to a user B to have restricted access to the contact information present in the synchronized phone book on a cloud server. The embodiment helps a user to share contact information between multiple users. Similarly, the user B can grant permission to the user A to have restricted access to contact information present in the synchronized phone book.

In another embodiment of the present invention, it includes support for languages other than English. Therefore, the present invention can analyse a voice sample in any featured language.

In yet another embodiment of the present invention, users can share the contacts without having a conversation. For example, a user A decides to have the contact information of a user B, wherein the user A and the user B are in close proximity. The user A records the voice samples of the user B on the user A's electronic device. The system generates a voice signature for the user B and stores it as part of the contact information in the phone book.

In another embodiment of the present invention, if a user has contact information without a voice signature, voice signature is generated at a later instance. For the contacts without the voice signature, the voice signature is generated at an instance a call is made and is mapped based on the number of the caller. For example, a user B has the contact of a user A, but without a voice signature. The user A initiates a call to user B, the system recognizes an existing contact information is present without the voice signature. Further, the system generates the voice signature of user A and maps the voice signature to the existing contact information in the phone book of user B.

In another embodiment of the present invention, if during the course of conversation with a caller, the caller does not identify himself. The system can recommend keywords based on the conversation. Further, the user can store the contact information based on a keyword to remember the caller at future instances.

In another embodiment of the present invention, the system can store the voice signature of all users present during a call and use the voice signatures to identify a contact at a later instance. For example, a user A is initiating a call to a user B and a user C is present along with user B. During the conversation between the user A and the user B, the voice signature of the user C is also stored in the phone book of the user A. In future, if the user C initiates a call to the user A, then the contact information of the user C is automatically updated in the mobile phone of the user A.

Advantageously, the embodiments specified in the present invention enable the user to identify a caller efficiently. The caller can be one of a first time caller and a known caller. For the first time caller and the known caller, the present invention is capable of identifying the caller based on voice. On identification, the contact information is saved in the phone book, thereby eliminating the need for manually saving contact information in the phone book.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A method of updating contact information in an electronic device, the method comprising:
    capturing a voice of a caller to generate voice samples;
    generating a voice signature based on the voice samples;
    determining presence of the voice signature in the electronic device;
    extracting, if there is not the voice signature in the electronic device, relevant keywords from the voice samples;
    displaying the relevant keywords on a screen of the electronic device to be selectable by a user;
    receiving a keyword from the user; and
    updating the contact information of the caller to comprise the voice signature, a caller's number and the keyword.

2. The method as claimed in claim 1, further comprising:
    updating, if there is the voice signature in the electronic device, the contact information of the caller to map the voice signature with the caller's number.

3. The method as claimed in claim 1, wherein the contact information comprises at least one of a name associated with a caller's telephone number, caller's email, and caller's address.

4. The method as claimed in claim 1, further comprising:
    suppressing noise in the voice samples, equalizing the voice samples, and compensating distortion in the voice samples.

5. The method as claimed in claim 1, wherein the electronic device is at least one of a mobile phone, smartphone, a smart watch and a tablet.

6. An electronic device comprising:
    a processor configured to capture a voice of a caller, sample the voice of the caller to generate voice samples, generate a voice signature of the caller based on the voice samples, compare the voice signature with a plurality of voice signatures, and extract relevant keywords from the voice samples if there is no match for the voice signature;
    a display unit configured to display the relevant keywords on a screen to be selectable by a user; and
    an input device configured to receive a keyword from the user;
    wherein the processor is further configured to update the contact information of the caller to comprise the voice signature, a caller's number and the keyword.

7. The electronic device as claimed in claim 6, wherein if there is a match for the voice signature, the processor is further configured to update contact information of the caller to map the voice signature with the caller's number.

8. The electronic device as claimed in claim 6, wherein the contact information comprises at least one of a name associated with a caller's telephone number, caller's email, and caller's address.

9. The electronic device as claimed in claim 6, wherein the electronic device is at least one of a mobile phone, smartphone, a smart watch, and a tablet.

10. An electronic device comprising:
    a communication interface configured to receive voice samples of a caller from a mobile client; and
    a processor configured:
        to generate a voice signature of the caller based on the voice samples,
        to compare the voice signature with a plurality of voice signatures, and
        to extract relevant keywords from the voice samples if there is no match for the voice signature;
    wherein the communication interface is further configured to transmit the relevant keywords to the mobile client, and receive a keyword from the mobile client, and
    wherein the processor is further configured to update the contact information of the caller to comprise the voice signature, a caller's number and the keyword.

11. The electronic device as claimed in claim 10, wherein if there is a match for the voice signature, the processor is further configured to update contact information of the caller to map the voice signature with the caller's number.

12. The electronic device as claimed in claim 10, wherein the mobile client is one of a mobile phone, a smartphone, a smart watch, and a tablet.

13. The electronic device as claimed in claim 10, wherein the electronic device is configured to reside on a cloud server.

* * * * *